May 6, 1924.

D. H. WOMACK

COMBINED DIPPING TANK AND INSECT TRAP

Filed Sept. 9, 1922

D. H. Womack
INVENTOR.

BY Geo. P. Kimmel
ATTORNEY.

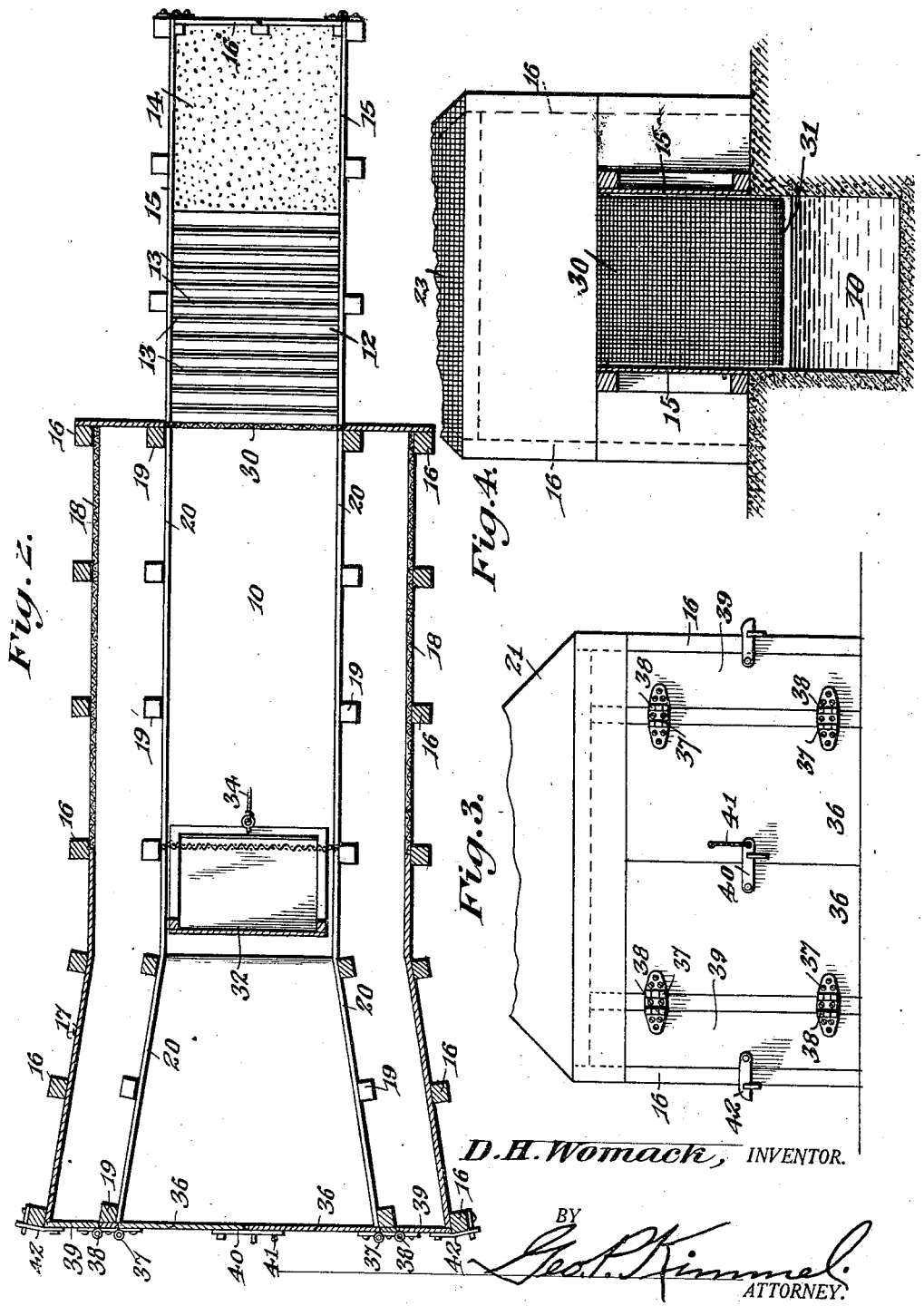

Patented May 6, 1924.

1,493,411

UNITED STATES PATENT OFFICE.

DANIEL H. WOMACK, OF DACUS, TEXAS.

COMBINED DIPPING TANK AND INSECT TRAP.

Application filed September 9, 1922. Serial No. 587,165.

*To all whom it may concern:*

Be it known that I, DANIEL H. WOMACK, a citizen of the United States, residing at Dacus, in the county of Montgomery and State of Texas, have invented certain new and useful Improvements in Combined Dipping Tank and Insect Trap, of which the following is a specification.

This invention relates to combined animal dipping and fly and other insect trapping devices, and has for one of its objects to provide an apparatus wherein the animals are effectually "dipped" and the flies and other insects not destroyed by the dipping are trapped as they rise from the animals' bodies during the dipping.

Another object of the invention is to provide a device of this character, including a runway from the entrance to the dipping vat and extending to the end of the drain platform and with the intake portion constructed with impervious walls and the outlet portion with foraminous walls so that the animals pass from a relatively dark portion into the tank and also into a relatively light portion, to cause the insects displaced by the liquid in the tank to naturally rise toward the lighter portion and are there trapped and destroyed, the fly-trap extending partly over the dipping vat.

Another object of the invention is to provide a device of this character, having means whereby the animals are prevented from jumping over or across the dipping tank, when relatively short tanks are employed.

With these and other objects in view, the invention consists in certain novel features of construction as hereinafter shown and described and then specifically pointed out in the claims, and in the drawings illustrative of the preferred embodiment of the invention:—

Fig. 2 is a plan view of the parts shown in Fig. 1, in section on the line 2—2 of Fig. 1, Fig. 3 is an end elevation from the inlet end, Fig. 4 is an end elevation from the discharge or outlet end, the tank being in section on the line 4—4 of Fig. 1.

Figure 1:
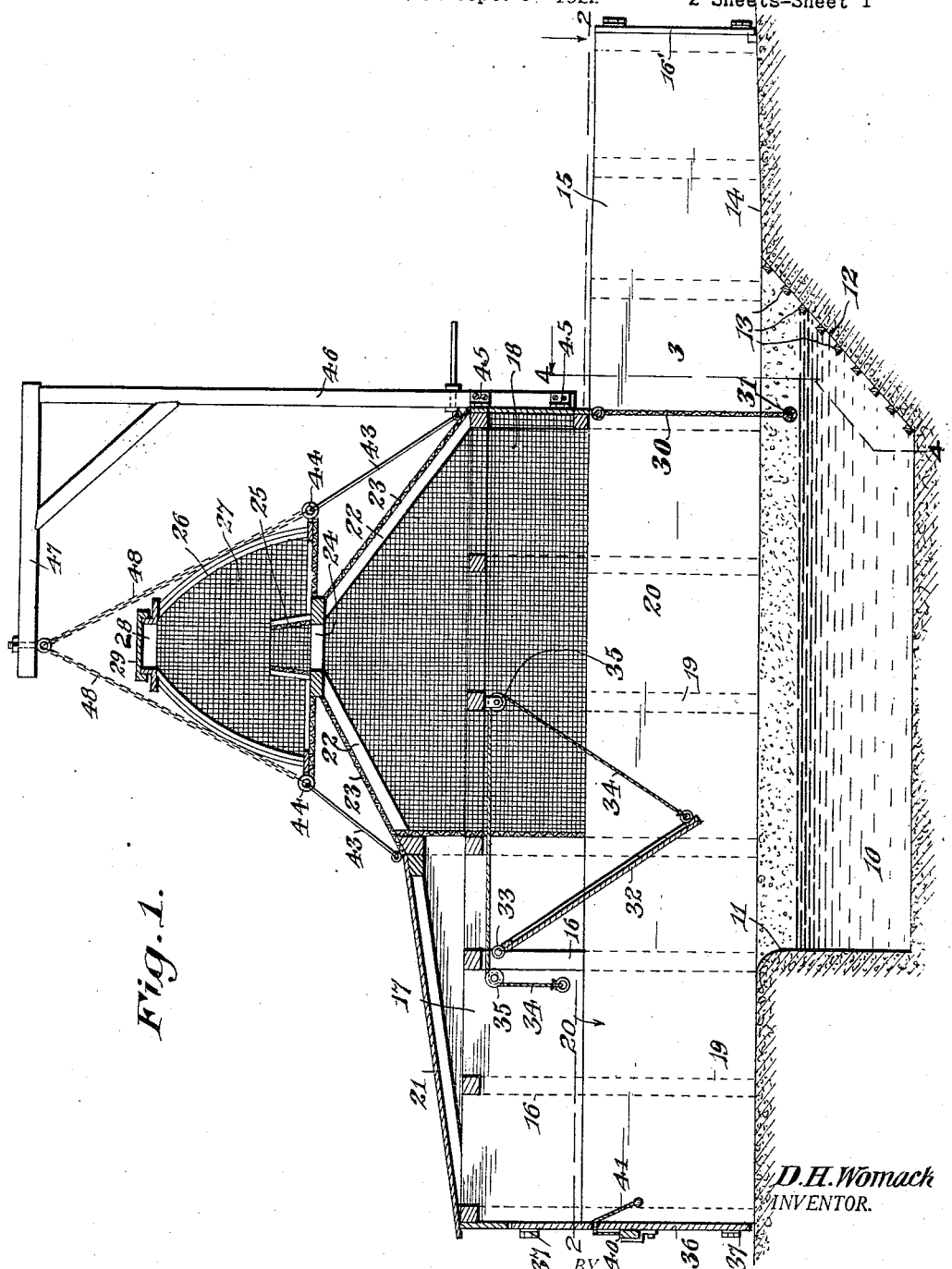
Figure 1 is a longitudinal sectional elevation of the improved apparatus.

The improved apparatus will be erected in coactive relation with an animal dipping tank, represented conventionally at 10, and preferably with an abrupt intake 11 and inclined outlet end 12, the latter having a plurality of cleats 13 to enable the animals to easily leave the tank after the dipping operation.

A runway extends over the approach to the tank and also partly over the tank, leaving the inclined outlet 12 free and unobstructed, as shown in Figs. 1 and 2.

A drainage platform, indicated at 14, extends beyond the outlet end 12 of the tank and preferably slightly inclined toward the tank to carry the solution which drips from the animals back into the tank. The drainage platform is enclosed by a fence like structure represented at 15 and provided with outlet gates 16 of suitable construction, to control the length of time which the animals may be retained on the platform. The platform 14 and fence 15 may be of any size desired.

The side walls of the runway are formed of supporting posts 16 and boards or sheet metal plates 17, except the upper part of the portion of the outer wall which extends alongside the tank which is formed of screen material, represented at 18.

Disposed within the area defined by the walls 17 and spaced therefrom are inner walls formed by posts 19 and sheathing 20 of any suitable material to form runways at each side of the animal runway to provide access to the sides of the tank by the attendants to enable them to force the animals into the tank. The wall 19—20 is only breast high or five or six feet, and is in alinement with the drainage platform fence 15, as shown in Fig. 1.

The fence portion 15 and 20 serves as "splash boards" to catch the solution which may be thrown up by the struggles of the animals when in the tank or their shakings when on the drainage platform, and return it to the tank, thus avoiding waste of the solution.

The top or roof 21 of the intake portion of the runway is also of impervious material as shown in Fig. 1. The part of the structure above the screened portion 18 is formed by inclined rafter members 22 to produce a converging frame to support screen material 13 and terminating in a contracted discharge 24. Extending upwardly from the discharge 14 is an inwardly inclined guideway 25 for the escaping insects. Bearing over the discharge 19—20, is a trap device comprising a frame 26 which supports screen material 27.

At its upper end the cage frame members 26 converge and are attached to an annular member 28 over which a cap 29 engages.

Depending from the framework at the outlet end of the runway is a curtain 30 of screen material, weighted at the lower end as at 31, to maintain it yieldably in vertical position but which will be pushed outwardly by the animals in leaving the tank. The apron 30 thus operates to prevent flies or other insects from escaping from the tank at the outlet end, while at the same time offering no obstruction to the passing of the animals from the tank.

When relatively short tanks are used, over which some animals would be inclined to jump rather than plunge into the solution, a swinging door, or guide member may be employed, and represented at 32 and extending transversely of the tank and hinged at 33 to one of the head timbers or other portion of the framework.

A pull cable 34 is attached to the door member 32 and leads over guide pulleys 35 and thence to the narrow runway formed by the fence or partition 19—20, to enable the door 32 to be adjusted, as required, from the narrower runway.

The side walls of the runways diverge or are enlarged toward the outer or inlet end, as shown in Fig. 2, and the inlet end is closed by doors 36 hingedly supported at 37 to the rear posts 19 of the side runways, and hingedly united at 38, preferably to the same posts 19, are smaller doors 39 forming closures for the smaller side runways. By this means independent access to the central runway or the side runways is provided, as will be obvious.

The doors 36 are provided with a suitable latch device 40, preferably provided with a pull cord 41 operative either from the inside or outside of the doors, and the smaller doors 39 are also provided with suitable catches or latches 42. Guy wires or cords 43 may be attached at one end to eyes 44 on the frame of the trap, and coupled at the other ends to the rafters 17, or other stationary part, to hold the trap in place and prevent it from being blown off.

By this arrangement, it will be noted that the entrance portion of the runway is comparatively dark while the upper screened portion of the runway or the part which is located above the tank, is comparatively light, hence the insects displaced by the liquid in the tank in which the animals are immersed, will naturally seek the light and pass up the inclined or converging sides of the cage and thence into the trap.

Swingingly united at 45 to the main frame work is a derrick device comprising a mast 46 and a "boom" 47, adapted to be coupled to the cage 21—23, for instance by chains or cables indicated at 48 to the eye bolts 44, to enable the cage to be lifted clear of the guideway 20, and replaced thereon, when required.

The improved device is simple in construction, can be constructed of any suitable material and of any size, and adapted to tanks of various sizes and forms.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

1. An apparatus of the class described comprising a dipping tank, a runway extending partly over said tank and with imperforate walls for a portion of its length and foraminous walls for the remainder of its length, the upper portion of the foraminous walls converging to a contracted discharge opening, an insect trap device removably disposed over said opening, and a curtain device of foraminous material swingingly suspended transversely of the outlet end of the runway.

2. In an apparatus of the class described, a runway having closed sides and top and with intake doors at one end and open at the other end and in communication with a dipping tank, an extension of the runway having the upper portion formed with foraminous walls and terminating in a contracted outlet adapted to communicate with an insect trap, and guide fences within the main runway and spaced from its side walls and providing side runways in parallel relation to the main runway.

In testimony whereof, I affix my signature hereto.

DANIEL H. WOMACK.